(12) United States Patent
Gandelsman

(10) Patent No.: US 10,261,489 B2
(45) Date of Patent: Apr. 16, 2019

(54) DETECTION OF MIS-CONFIGURATION AND HOSTILE ATTACKS IN INDUSTRIAL CONTROL NETWORKS USING ACTIVE QUERYING

(71) Applicant: INDEGY LTD., Tel Aviv (IL)

(72) Inventor: Mille Gandelsman, Haifa (IL)

(73) Assignee: INDEGY LTD., Tel Aviv (IL)

( * ) Notice: Subject to any disclaimer, the term of this patent is extended or adjusted under 35 U.S.C. 154(b) by 429 days.

(21) Appl. No.: 14/686,878

(22) Filed: Apr. 15, 2015

(65) Prior Publication Data

US 2016/0306337 A1 Oct. 20, 2016

(51) Int. Cl.
| G05B 19/05 | (2006.01) |
| G05B 19/418 | (2006.01) |
| G06F 21/51 | (2013.01) |
| G06F 21/57 | (2013.01) |

(52) U.S. Cl.
CPC ....... *G05B 19/058* (2013.01); *G05B 19/4185* (2013.01); *G06F 21/51* (2013.01); *G06F 21/572* (2013.01); *G05B 2219/13197* (2013.01); *G05B 2219/24159* (2013.01); *G05B 2219/31203* (2013.01); *G05B 2219/31362* (2013.01); *G05B 2219/31436* (2013.01); *Y02P 90/18* (2015.11)

(58) Field of Classification Search
CPC .................. G05B 19/058; G05B 15/02; G05B 2219/13116
USPC .......................................................... 700/81
See application file for complete search history.

(56) References Cited

U.S. PATENT DOCUMENTS

| 7,870,394 B2 | 1/2011 | Repast et al. |
| 8,490,189 B2 | 7/2013 | Prakash et al. |
| 8,584,242 B2 | 11/2013 | Lagar-Cavilla et al. |
| 8,635,705 B2 | 1/2014 | Sahita et al. |
| 8,640,246 B2 | 1/2014 | McDougal et al. |
| 8,850,584 B2 | 9/2014 | Alme et al. |
| 10,015,188 B2 | 7/2018 | Schneider et al. |
| 2005/0182969 A1 | 8/2005 | Ginter et al. |
| 2008/0154957 A1* | 6/2008 | Taylor ................... G06F 9/4411 |
| 2008/0209518 A1* | 8/2008 | Sturges ............... H04L 63/1408 726/3 |
| 2012/0005480 A1* | 1/2012 | Batke .................... G06F 21/572 713/175 |
| 2012/0102477 A1* | 4/2012 | Kim ........................ G06F 8/665 717/169 |
| 2012/0230309 A1* | 9/2012 | Junk ................... G05B 19/4186 370/338 |
| 2013/0283381 A1 | 10/2013 | Thadikaran et al. |
| 2014/0189860 A1 | 7/2014 | Hull Roskos |

(Continued)

OTHER PUBLICATIONS

"Introduction to Programmable Logic Controllers (PLCs)—Industrial 15 Control Systems", Lecture—Introduction to PLCs, MME 486, 47 pages, Fall 2006.

*Primary Examiner* — Thomas C Lee
*Assistant Examiner* — Alan Chu
(74) *Attorney, Agent, or Firm* — Kligler & Associates

(57) ABSTRACT

A method includes requesting a controller, which controls one or more field devices in an industrial control network, to report code currently used by the controller for controlling the field devices. The code reported by the controller is compared with a stored baseline version of the code, and a notification is issued upon detecting a discrepancy between the code reported by the controller and the baseline version.

9 Claims, 2 Drawing Sheets

(56) References Cited

U.S. PATENT DOCUMENTS

2014/0337277 A1* 11/2014 Asenjo .................. G06Q 10/06 707/603
2015/0264080 A1* 9/2015 Bu er ...................... G06F 21/57 726/23

* cited by examiner

DETECTION OF MIS-CONFIGURATION AND HOSTILE ATTACKS IN INDUSTRIAL CONTROL NETWORKS USING ACTIVE QUERYING

FIELD OF THE INVENTION

The present invention relates generally to network management, and particularly to methods and systems for managing industrial control networks.

BACKGROUND OF THE INVENTION

Industrial Control Systems (ICSs) typically comprise Programmable Logic Controllers (PLCs) that control various field devices. A typical PLC can be configured with suitable logic and parameters for operating the field devices to implement a desired industrial process. PLCs are described, for example, in "Introduction to Programmable Logic Controllers (PLCs)—Industrial Control Systems," 2006, which is incorporated herein by reference.

SUMMARY OF THE INVENTION

An embodiment of the present invention that is described herein provides a method including requesting a controller, which controls one or more field devices in an industrial control network, to report code currently used by the controller for controlling the field devices. The code reported by the controller is compared with a stored baseline version of the code, and a notification is issued upon detecting a discrepancy between the code reported by the controller and the baseline version.

In some embodiments, the code includes at least one code type selected from a group of types consisting of firmware, application logic and configuration parameters of the controller. In an embodiment, comparing the reported code to the baseline version includes comparing a first digest of the reported code with a second digest of the baseline version. In another embodiment, requesting the controller to report the code includes emulating an engineering protocol used for configuring the controller.

In some embodiments, the method further includes verifying the stored baseline version of the code by intercepting code-update transactions exchanged with the controller. Verifying the stored baseline version may include outputting an alert in response to determining that an intercepted code-update transaction is illegitimate. Additionally or alternatively, verifying the stored baseline version may include, in response to determining that an intercepted code-update transaction is legitimate, updating the stored baseline version with the intercepted code-update transaction.

There is additionally provided, in accordance with an embodiment of the present invention, an apparatus including a memory and a processor. The memory is configured to hold a baseline version of code used by a controller to control one or more field devices in an industrial control network. The processor is configured to request the controller to report the code currently used by the controller for controlling the field devices, to compare the code reported by the controller with the baseline version of the code stored in the memory, and to issue a notification upon detecting a discrepancy between the code reported by the controller and the baseline version.

There is further provided, in accordance with an embodiment of the present invention, a computer software product, the product including a tangible non-transitory computer-readable medium in which program instructions are stored, which instructions, when read by a processor, cause the processor to request a controller, which controls one or more field devices in an industrial control network, to report code currently used by the controller for controlling the field devices, to compare the code reported by the controller with a stored baseline version of the code, and to issue a notification upon detecting a discrepancy between the code reported by the controller and the baseline version.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for managing industrial control networks. In a typical industrial control network, one or more controllers implement a desired industrial process by controlling field devices. Each controller typically runs code, which comprises firmware, application logic and/or configuration parameters. The firmware is typically installed by the controller manufacturer, whereas the application logic and configuration parameters are typically configured in accordance with the specific industrial process being performed.

In some embodiments, a management appliance identifies suspected operational mis-configurations and/or hostile attacks on a controller (e.g., a Programmable Logic Controller—PLC) by detecting that some code of the controller has been changed unexpectedly. In a typical flow, the appliance requests the controller to report at least part of the currently-used code, e.g., firmware, application logic and/or parameters. The appliance compares the code reported by the controller to a trustworthy baseline version of the code (possibly comprising separate baseline versions of the firmware, application logic and parameters). A mismatch between the two versions may indicate an erroneous but legitimate mis-configuration, or a hostile attack.

In some embodiments, the appliance continually verifies that the baseline version it holds is indeed trustworthy and up-to-date. In an example embodiment, the appliance passively listens for any code-update transactions exchanged with the controller, verifies that such transactions are legitimate, and updates the baseline version as needed. This passive process complements the above-described active querying of the controller.

System Description

Figure 1:
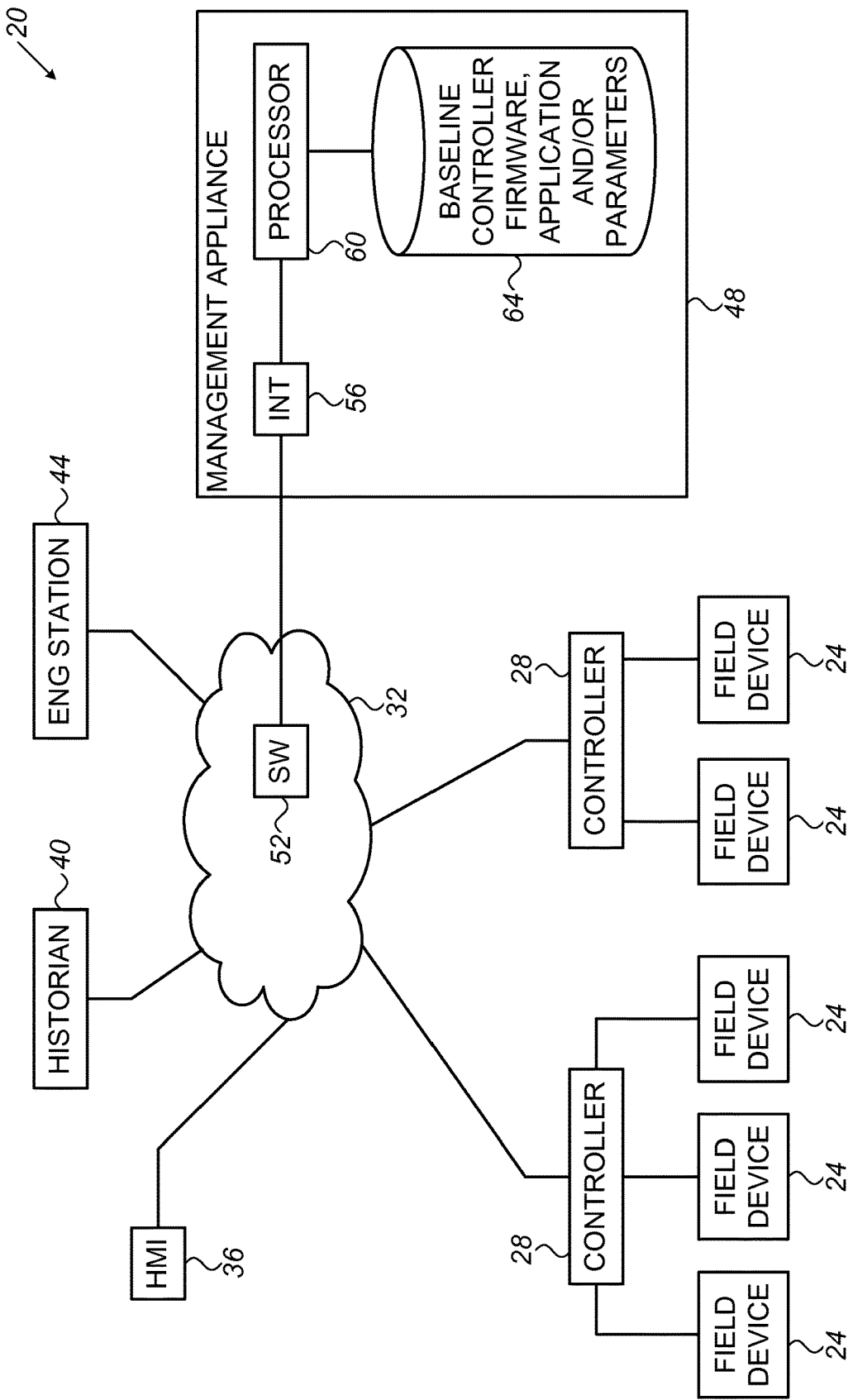
FIG. 1 is a block diagram that schematically illustrates an industrial control network, in accordance with an embodiment of the present invention.

FIG. 1 is a block diagram that schematically illustrates an industrial control network 20, in accordance with an embodiment of the present invention. Network 20 typically controls field devices 24 that carry out a desired industrial process in some industrial environment, e.g., a factory production line, a power plant, a chemical plant or any other suitable environment.

In the example of FIG. 1, network 20 comprises one or more field devices 24 that are controlled by one or more controllers 28. Field devices 24 typically comprise electromechanical devices that perform actions such as, for example, opening and closing valves, controlling electrical relays and circuit breakers, collecting data from environmental sensors, monitoring alarm conditions and other events, or any other suitable action.

Controllers 28 may comprise, for example, Programmable Logic Controllers (PLCs). Each controller 28 typically controls one or more of field devices 24. A controller typically communicates with a field device using a suitable (e.g., serial) interface so as to instruct the field device to perform various actions and/or to collect data and measurements from the field device.

Controllers 28 are typically connected by a Local Area Network (LAN) 32. LAN 32 may be wired and/or wireless, and may operate in accordance with any suitable communication protocol, e.g., Ethernet. Additional network nodes that may be connected to LAN 32 comprise, for example, a Human-Machine Interface (HMI) station 36, a historian 40 and an engineering station 44.

HMI station 36 is used by an operator for monitoring and controlling the industrial process via controllers 28. Historian 40 is used for collecting and logging relevant data relating to the process for later analysis. Engineering station 44 is used by technical staff for controlling and configuring network 20, and particularly controllers 28.

In the disclosed embodiments, network 20 further comprises a management appliance 48. Appliance 48 detects changes made in the firmware, application logic and/or configuration parameters of one or more of controllers 28, so as to detect mis-configuration and/or hostile attacks on controllers. As such, the appliance can be used as a management tool, as a security tool, or both. The functionality of appliance 48 is described in detail further below.

In the example of FIG. 1, management appliance 48 comprises a network interface 56 for connecting to LAN 32. In the present example, although not necessarily, appliance 48 is connected to a network switch 52 or other network element in LAN 32. Appliance 48 further comprises a processor 60 that is configured to carry out the methods described herein, and a database 64 that is configured to store one or more baseline versions of the controller firmware, application logic and/or configuration parameters. In some embodiments processor 60 uses these baseline versions for detecting possible mis-configurations of controllers 28 and/or hostile attacks on the controllers.

The configurations of network 20 and management appliance 48 shown in FIG. 1 are example configurations, which are chosen purely for the sake of conceptual clarity. In alternative embodiments, any other suitable configurations can be used for network 20 and/or appliance 48. For example, management appliance 48 may be implemented on a standalone server or other platform, as software running on an existing platform such as engineering station 44, or in any other suitable way. Typically, however, appliance 48 is implemented as a separate trusted platform that is independent of other network elements and is therefore less susceptible to attack. In an embodiment, appliance 48 may be implemented as a virtual appliance that runs on a hypervisor in network 20.

The different elements of appliance 48 may be implemented using suitable software, using hardware, e.g., using one or more Application-Specific Integrated Circuits (ASICs) or Field-Programmable Gate Arrays (FPGAs), or using a combination of software and hardware elements. Database 64 may be implemented using any suitable memory, such as a solid-state or magnetic storage device.

Typically, processor 60 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Active Detection of Mis-Configuration or Hostile Attack on Controller Firmware, Logic and/or Parameters A controller 28, e.g., PLC, is typically configured with firmware code that implements the basic controller functions and operating system. When deployed to perform a particular process in network 20, each controller 28 is configured with suitable application logic and configuration parameters to perform the desired process. In the context of the present patent application and in the claims, the controller firmware, application logic and configuration parameters are referred to collectively as "code" or "controller code."

The application logic typically specifies sequences of operations, rules and conditions, and/or other logic for operating field devices 24. The configuration parameters typically specify numerical values for the application logic, e.g., temperature thresholds and time durations. As another example, configuration parameters may specify memory addresses and/or protocol attributes for communication between controller 28 and field devices 24. Typically although not necessarily, the firmware is configured by the controller manufacturer, whereas the application logic and parameters are configured in network 20, e.g., by engineering station 44 or HMI station 36.

In some embodiments, it is possible to modify and reconfigure the firmware, logic and/or parameters of a given controller 28 by communicating with the controller over LAN 32. As such, controllers 28 are prone to hostile attacks that illegitimately attempt to modify their firmware, logic and/or parameters. Controllers 28 are also prone to innocent but erroneous firmware, logic and/or parameter reconfigurations.

In some embodiments, management appliance 48 detects such hostile attacks and/or mis-configuration of code of a controller 28, and initiates or takes appropriate action. The detection is based on actively querying the controller to report its current code version, and comparing the code version reported by the controller with a baseline version stored in database 64. In some embodiments, appliance 48 verifies that the baseline version in database 64 is indeed trustworthy and up-to-date by passively monitoring LAN 32 for transactions that update the code version.

The description that follows refers to a single version, for the sake of clarity. In a real-life implementation, database 64 may hold multiple baseline code versions, e.g., separate baseline versions of firmware, logic and/or parameters, and/or separate baseline code versions for different controllers or controller types in network 20. In such embodiments, processor 60 chooses the appropriate baseline version for comparison when querying a given controller 28.

Figure 2:
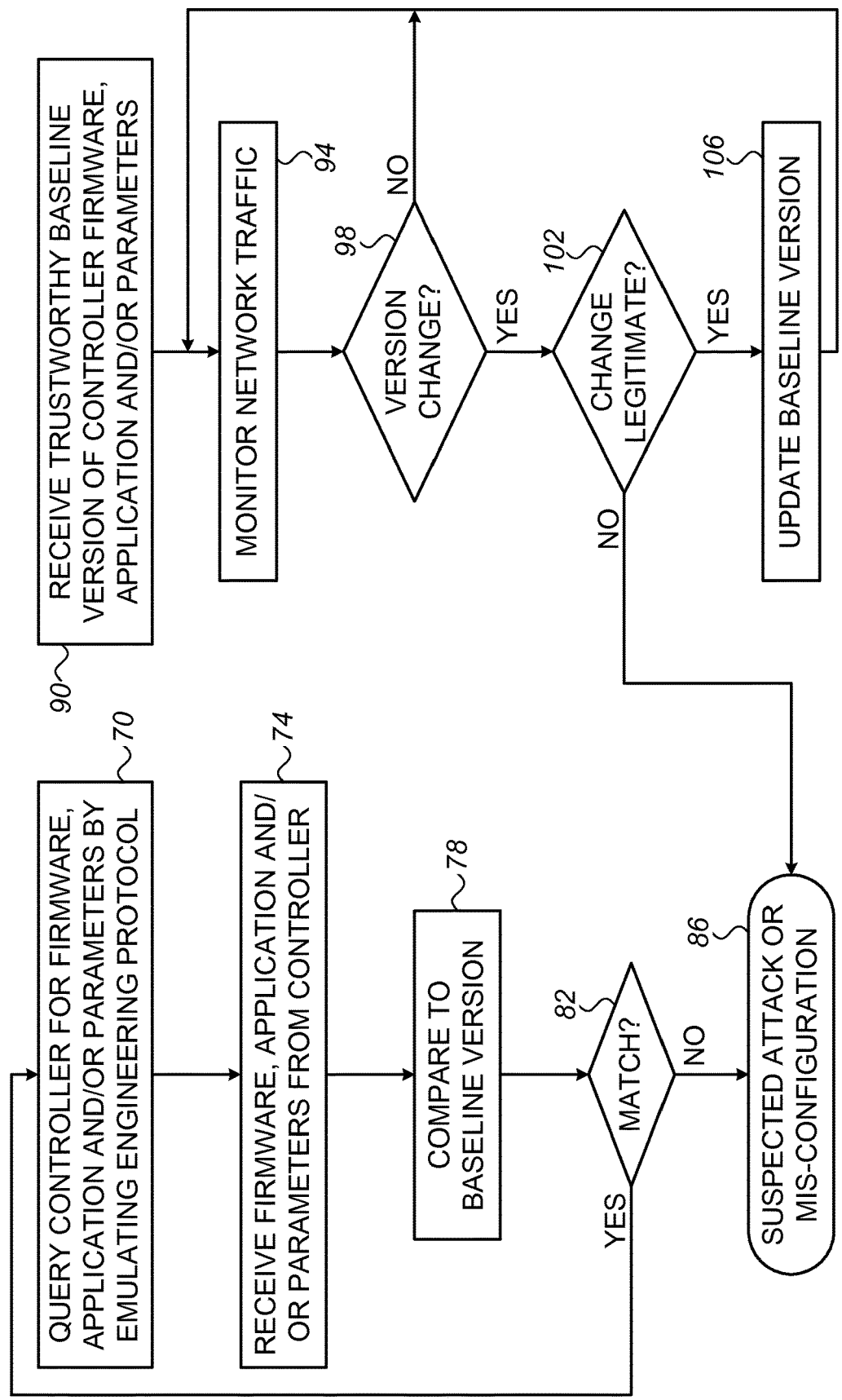
FIG. 2 is a flow chart that schematically illustrates a method for detecting mis-configuration or hostile attack on a controller in an industrial control network, in accordance with an embodiment of the present invention.

FIG. 2 is a flow chart that schematically illustrates a method for detecting mis-configuration or hostile attack on a controller 28 in industrial control network 20, in accordance with an embodiment of the present invention. The left-hand-side of the figure shows the active querying process, while the right-hand-side of the figure shows the passive monitoring process. Both processes are typically carried out irrespective of one another.

The active querying process begins with processor 60 of appliance 48 querying a given controller 28 to report its current code version, by communicating over LAN 32 via interface 56. The description that follows refers to querying for the entire code version, for the sake of clarity. Alternatively, processor 60 may query for, and receive, any suitable portion of the controller code, e.g., at least a portion of the firmware, at least a portion of the application logic and/or at least a portion of the configuration parameters. As will be described further below, processor 60 may receive a compact-form digest computed over the code, or both code and digest.

Processor 60 may use any suitable criterion or policy for deciding which controller to query and at what time. For example, processor 60 may query the various controllers at periodic intervals, or in response to some triggering event. A triggering event may comprise, for example, installation of a new controller in network 20, an access to network 20 by a third party, or any other suitable event.

In some embodiments, controllers 28 support at least two separate communication protocols over LAN 32—A protocol for ongoing communication during operation of network 20, and an engineering protocol for code configuration. In some cases the engineering protocol already supports a command for querying the controller to report its code version. In an embodiment, processor 60 queries the controller at step 70 by emulating this command of the engineering protocol.

At a reception step 74, processor 60 receives the current code version reported by the controller, over LAN 32 via interface 56. At a comparison step 78, processor 60 compares the current code version reported by controller 28 with a corresponding baseline version stored in database 64.

Processor 60 may compare the reported code version with the baseline version in any suitable way. In some embodiments, each controller code version is represented using some compact-form digest, which may be generated from the code using any suitable cryptographic or non-cryptographic means. A digest may comprise, for example, a cryptographic signature or certificate, or a hash value computed over at least a portion of the code. In another embodiment, the digest may simply comprise a version number or code assigned to the code.

In an embodiment, when controller 28 is queried, it returns the code version along with the respective digest. Processor 60 compares the digest of the reported code version with the digest of the baseline version stored in database 64.

More generally, database 64 may hold only digests of baseline code without the actual code, only baseline code without the digests, or both code and digests. All of these options are regarded as "holding a baseline version in memory." When queried, controller 28 may return only the digest of its code without the actual code, only the code without the digest, or both code and digest. All of these options are regarded as "reporting the code used by the controller."

Depending on the chosen implementation, processor 60 may perform the comparison after computing the digest over the code received from controller 28 and/or over the baseline code version in database 64, in case the digest is not stored or provided a-priori.

In alternative embodiments, processor 60 compares the actual code, e.g., performs a bit-wise comparison of the entire code or of selected portions thereof. In some embodiments, different parts of the code may be compared in different ways. For example, processor 60 may compare application logic versions using bit-wise comparison of the actual code, and compare firmware versions by comparing version numbers. Further alternatively, processor 60 may compare the reported code version with the baseline version in any other suitable way.

At a match checking step 82, processor 60 checks whether the comparison at step 78 indicates that the reported code version and the baseline code version match. If the versions match, processor 60 concludes that no mis-configuration or hostile attack has occurred, and the method loops back to step 70 above.

Otherwise, i.e., upon detecting a discrepancy between the code version reported by the queried controller and the baseline code version stored in database 64, processor 60 declares a suspected attack or mis-configuration of the controller, at a detection step 86. In such a case, processor 60 may take or initiate any suitable action, e.g., send a notification to HMI station 36, shut down or isolate the controller in question, or take any other suitable action.

The passive monitoring process, shown on the right-hand-side of FIG. 2, begins with processor 60 receiving a trustworthy baseline version of the controller code, at a baseline reception step 90. The processor stores the baseline version in database 64.

At a monitoring step 94, processor 60 monitors the communication traffic exchanged over LAN 32. At a code-update checking step 98, processor 60 checks whether the monitored traffic contains a transaction that involves a change of controller code version. If not, the method loops back to step 94 above.

If a code-update transaction is detected in the traffic, processor 60 checks whether the update is legitimate, at a legitimacy checking step 102. A code-update transaction may be considered legitimate, for example, if it is performed by an authorized user (e.g., the plant control engineer) during a shift replacement. A code-update transaction may be considered illegitimate, for example, if it is performed by an unrecognized entity in network 20.

If processor 60 suspects that the code update transaction is illegitimate, e.g., part of a hostile attack, the method moves to detection step 86, in which processor 60 sends a notification to the user or takes other action.

If the code update is regarded legitimate, processor 60 updates database 64 with the updated code version, at an updating step 106. The method then loops back to step 94 above, in which processor 60 continues to monitor the traffic in LAN 32. From this point, comparisons with the baseline version (step 78 of the active querying process) will be performed using the updated baseline version.

Although the embodiments described herein mainly address controllers in industrial control networks, the methods and systems described herein can also be used in other applications, such as for management and security of other types of controllers, e.g., in medical equipment, aerospace equipment, automotive equipment and the like.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

in a management appliance that is connected to an industrial control network in which a controller controls one or more field devices, running in parallel a passive monitoring process and an active querying process, wherein the passive monitoring process comprises (i) continuously intercepting traffic exchanged over the industrial control network, (ii) checking whether the intercepted traffic comprises a code-update transaction that is sent to the controller and based on which the controller updates a code currently used for controlling the field devices, (iii) if the traffic comprises the code-update transaction, checking whether the code-update transaction is legitimate, and (iv) if the code-update transaction is legitimate, using the code-update transaction to update an up-to-date trustworthy baseline version of the code stored in the management appliance, and wherein the active querying process comprises (i) requesting the controller to report the code currently used by the controller for controlling the field devices, and (ii) comparing the code reported by the controller with the baseline version of the code; and interacting between the passive monitoring process and the active querying process, including issuing a notification (i) if the active querying process detects a discrepancy between the code reported by the controller and the baseline version that is being continuously updated by the passive monitoring process, or (ii) if the passive monitoring process detects that the code-update transaction is illegitimate.

2. The method according to claim 1, wherein the code comprises at least one code type selected from a group of types consisting of firmware, application logic and configuration parameters of the controller.

3. The method according to claim 1, wherein comparing the reported code to the baseline version comprises comparing a first digest of the reported code with a second digest of the baseline version.

4. The method according to claim 1, wherein requesting the controller to report the code comprises emulating an engineering protocol used for configuring the controller.

5. A management appliance connected to an industrial control network in which a controller controls one or more field devices, the management appliance comprising:

a memory; and a processor, which is configured to:

run in parallel a passive monitoring process and an active querying process, wherein the passive monitoring process (i) continuously intercepts traffic exchanged over the industrial control network, (ii) checks whether the intercepted traffic comprises a code-update transaction that is sent to the controller and based on which the controller updates a code currently used for controlling the field devices, (iii) if the traffic comprises the code-update transaction, checks whether the code-update transaction is legitimate, and (iv) if the code-update transaction is legitimate, uses the code-update transaction to update an up-to-date trustworthy baseline version of the code stored in the management appliance, and wherein the active querying process (i) requests the controller to report the code currently used by the controller for controlling the field devices, and (ii) compares the code reported by the controller with the baseline version of the code; and interact between the passive monitoring process and the active querying process, including issuing a notification (i) if the active querying process detects a discrepancy between the code reported by the controller and the baseline version that is being continuously updated by the passive monitoring process, or (ii) if the passive monitoring process detects that the code-update transaction is illegitimate.

6. The management appliance according to claim 5, wherein the code comprises at least one code type selected from a group of types consisting of firmware, application logic and configuration parameters of the controller.

7. The management appliance according to claim 5, wherein the processor is configured to compare the reported code to the baseline version by comparing a first digest of the reported code with a second digest of the baseline version.

8. The management appliance according to claim 5, wherein the processor is configured to request the controller to report the code by emulating an engineering protocol used for configuring the controller.

9. A computer software product, the product comprising a tangible non-transitory computer-readable medium in which program instructions are stored, which instructions, when read by a processor in a management appliance connected to an industrial control network in which a controller controls one or more field devices, cause the processor to:

run in parallel a passive monitoring process and an active querying process, wherein the passive monitoring process (i) continuously intercepts traffic exchanged over the industrial control network, (ii) checks whether the intercepted traffic comprises a code-update transaction that is sent to the controller and based on which the controller updates a code currently used for controlling the field devices, (iii) if the traffic comprises the code-update transaction, checks whether the code-update transaction is legitimate, and (iv) if the code-update transaction is legitimate, uses the code-update transaction to update an up-to-date trustworthy baseline version of the code stored in the management appliance, and wherein the active querying process (i) requests the controller to report the code currently used by the controller for controlling the field devices, and (ii) compares the code reported by the controller with the baseline version of the code; and interact between the passive monitoring process and the active querying process, including issuing a notification (i) if the active querying process detects a discrepancy between the code reported by the controller and the baseline version that is being continuously updated by the passive monitoring process, or (ii) if the passive monitoring process detects that the code-update transaction is illegitimate.

* * * * *